US010641250B2

(12) United States Patent
Olesen et al.

(10) Patent No.: US 10,641,250 B2
(45) Date of Patent: May 5, 2020

(54) METHOD OF OPERATING A WIND TURBINE

(71) Applicant: VESTAS WIND SYSTEMS A/S, Aarhus N (DK)

(72) Inventors: Ib Svend Olesen, Randers (DK); Avanindra Gupta, Superior, CO (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 480 days.

(21) Appl. No.: 15/539,574

(22) PCT Filed: Dec. 16, 2015

(86) PCT No.: PCT/DK2015/050400
§ 371 (c)(1),
(2) Date: Jun. 23, 2017

(87) PCT Pub. No.: WO2016/101955
PCT Pub. Date: Jun. 30, 2016

(65) Prior Publication Data
US 2017/0370350 A1 Dec. 28, 2017

Related U.S. Application Data

(60) Provisional application No. 62/096,114, filed on Dec. 23, 2014.

(30) Foreign Application Priority Data

Jan. 16, 2015 (DK) .................................. 2015 70023

(51) Int. Cl.
*F03D 80/40* (2016.01)
*F03D 17/00* (2016.01)

(52) U.S. Cl.
CPC ............ *F03D 80/40* (2016.05); *F03D 17/00* (2016.05); *F05B 2260/80* (2013.01);
(Continued)

(58) Field of Classification Search
CPC ....................................................... F03D 80/40
See application file for complete search history.

(56) References Cited

U.S. PATENT DOCUMENTS

2005/0276696 A1* 12/2005 LeMieux .................. F03D 7/02
416/61
2009/0246019 A1* 10/2009 Volanthen ............... F03D 80/40
416/1
2011/0285129 A1 11/2011 Li et al.
2012/0055247 A1 3/2012 Gonzalez Castro
2012/0292905 A1* 11/2012 Slot ........................ F03D 1/065
290/44
2013/0177417 A1 7/2013 Olesen

FOREIGN PATENT DOCUMENTS

CN 102177337 A 9/2011
CN 202280571 U 6/2012
(Continued)

OTHER PUBLICATIONS

Seifert et al., "Risk Analysis of Ice Throw", Apr. 2003, BOREAS, pp. 1-9 (Year: 2003).*
International Search Report for PCT/DK2015/050400, dated Mar. 21, 2016.
(Continued)

*Primary Examiner* — Janet L Suglo
(74) *Attorney, Agent, or Firm* — Patterson + Sheridan, LLP

(57) ABSTRACT

The present invention provides a method of operating a wind turbine. The wind turbine comprises at least one rotatable blade. The method comprises the steps of providing a load sensor configured to generate a load signal representing loading on the blade, generating a first load signal when the (Continued)

blade is in a first position, and generating a second load signal when the blade is in a second position. Additionally, the method comprises steps of detecting a rotational speed of the blade, calculating a weight force on the blade based on the first and the second load signal, and calculating a centrifugal force on the blade based on the first and the second load signal. Subsequently, the weight force is compared with a predetermined weight force, and the centrifugal force is compared with a predetermined centrifugal force at the detected rotational speed. Finally, a risk of ice throw is determined based on the comparisons of the weight force and the centrifugal force with the predetermined forces.

13 Claims, 1 Drawing Sheet

(52) U.S. Cl.
CPC ... *F05B 2270/101* (2013.01); *F05B 2270/304* (2013.01); *F05B 2270/331* (2013.01); *F05B 2270/708* (2013.01); *F05B 2270/807* (2013.01); *F05B 2270/808* (2013.01); *Y02E 10/726* (2013.01)

(56) References Cited

FOREIGN PATENT DOCUMENTS

| EP | 1959127 A2 | 8/2008 |
| EP | 2112375 A2 | 10/2009 |
| KR | 20140014808 A | 2/2014 |
| KR | 20140014898 A | 2/2014 |
| WO | 2010046403 A2 | 4/2010 |
| WO | 2014124725 A1 | 8/2014 |

OTHER PUBLICATIONS

Danish Search Report for PA 2015 70023, dated Jul. 8, 2015.
Chinese Office Action for Application No. 201580070772.5 dated Aug. 21, 2018.

* cited by examiner

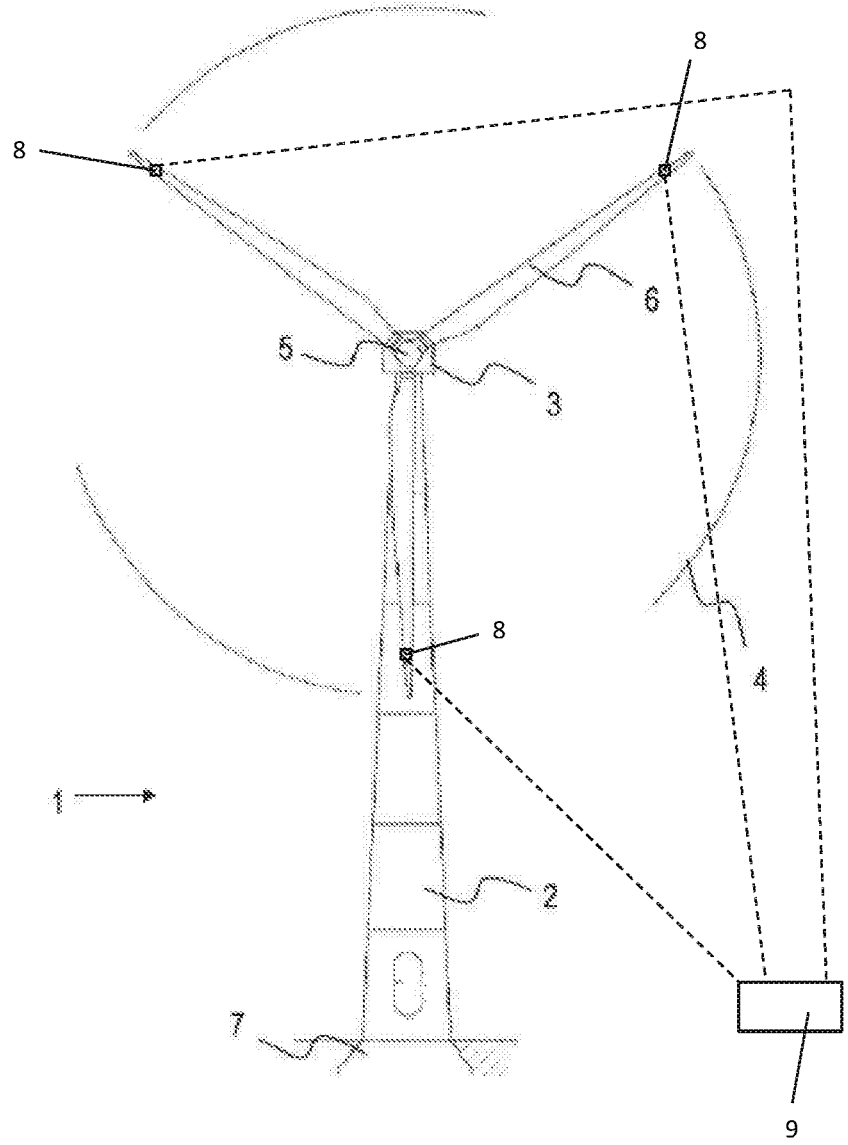

METHOD OF OPERATING A WIND TURBINE

FIELD OF THE INVENTION

The present invention relates to a method of operating a wind turbine.

BACKGROUND OF THE INVENTION

Traditionally, a wind turbine is stopped if ice is detected on the wind turbine blades or if there is a risk that there is ice on the blades, as ice breaking of the blades may fall off or may be thrown away from the blade and thus damage items or hurt humans.

However, if the wind turbine is erected in a closed area with no access or with controlled and monitored access, a certain amount of ice on the outer surface of the blades may be acceptable, if it can be assured that ice falling down from the blades or being thrown away form the blades cannot hit humans or fragile items outside the area or fragile items within the area.

DESCRIPTION OF THE INVENTION

It is an object of embodiment of the invention to provide an improved method of operating a wind turbine.

It is a further object of embodiments of the invention to provide a method which allows for an increased number of operating hours of a wind turbine.

It is an even further object of embodiments of the invention to provide a method which can detect the risk of ice being thrown away from wind turbine blades.

According to a first aspect, the invention provides a method of operating a wind turbine, the wind turbine comprising at least one rotatable blade, the method comprising the steps of;
 providing a load sensor configured to generate a load signal representing loading on the blade;
 generating a first load signal when the blade is in a first position;
 generating a second load signal when the blade is in a second position;
 detecting a rotational speed of the blade;
 calculating a weight force on the blade based on the first and the second load signal;
 calculating a centrifugal force on the blade based on the first and the second load signal;
 comparing the weight force with a predetermined weight force;
 comparing the centrifugal force with a predetermined centrifugal force at the detected rotational speed;
 determining a risk of ice throw based on the comparisons of the weight force and the centrifugal force with the predetermined forces.

By determining the risk of ice throw it may be possible to limit shut down periods for the wind turbine even in situations where ice is built up at the outer surface of the blades.

The load sensor(s) may by be attached to the blade, e.g. at the outer surface of the blade or may form part of the blade by being integrated in the blade. As ice may be attached to one blade and not the another blade, or as more ice may be attached to one blade than to another blade, it may be an advantage if each blade comprises at least one load sensor, as this enables the possibility of determining the risk of ice throw separately for each blade.

It should however be understood, that the determination may also be carried out based on load signals from only one blade.

The load sensor may be a traditional strain sensor, an optical FBG sensor (fibre Bragg grating), or other similar sensors. It may be an advantage if the load sensor is a linear sensor.

The load sensor is configured to generate a load signal which represents loading on the blade. The loading may be dependent on the weight of the blade which weight may be the weight of the blade itself, and may comprises an additional weight representing e.g. ice attached to the outer surface of the blade. Additionally, the loading may depend on the centrifugal force acting on the blade. As the centrifugal force depends on the rotational speed of the blade, the loading may thus vary in dependency hereof. Wind speed and direction may together with other aspects also influence the loading on the blades.

A first load signal is generated when the blade is in a first position. This first position may be any arbitrary position of the blade. The first load signal is preferably generated during rotation of the blade in order to be able to include loading dependent on the centrifugal force.

Additionally, a second load signal is generated when the blade is in a second position. This second position may be any arbitrary position of the blade. It is also preferred to generate the second load signal during rotation of the blade in order to be able to include loading dependent on the centrifugal force.

As the centrifugal force is dependent of the rotational speed of the blade, the rotational speed is also detected.

In order to determine the risk of ice throw with limited uncertainty, the generation of the first and second load signals may be carried out within a small time interval, e.g. within 1-10 rotations of the blade, such as within 1-5 rotations, or 1-3 rotations or the blade. In a specific embodiment, the first and second load signals are generation within one single rotation of the blade.

During periods with high turbulence wind conditions, it may be an advantage to generate more than one first load signal and more than one second load signal, and subsequently averaging these load signal to minimize the influence of the turbulence.

The rotational speed of the blade may be detected during the same time interval to get interrelated values for the load signals and the rotational speed. In cases where the first and second loads signals are generated within a plurality of rotations, e.g. within 3 rotations, the rotational speed may be detected for each of the rotations and subsequently an average value may be generated. Alternatively, one of the detected values for the rotational speed may be used, e.g. the highest or the lowest. In a further alternative, the rotational speed may only be detected for one of the three rotations.

As ice located on the blade of a wind turbine will increase the weight of the blade, the method includes a step of calculating a weight force on the blade. Thus, the weight force is a measure of a force acting on the blade due to the weight of the blade. This weight force is calculated based on the first and second load signals generated.

Likewise the centrifugal force is calculated based on the first and second load signal generated. The centrifugal force is measure of a force acting on the blade due to rotation of the blade, and the centrifugal is thus dependent on the rotational speed of the blade.

As the weight of the blade without ice located on the blade can be determined, e.g. before erecting the wind turbine, the predetermined weight force can likewise be determined before the wind turbine is erected. It should be understood, that by "predetermined weight force" is herein meant the force acting on the blade due to the weight of the blade, where the weight is the weight of the blade itself without ice. Alternatively, the predetermined weight force can be calculated based on the first and second load signals generated. In the latter case, the calculation should be performed on a day where no ice is location on the blade.

When comparing the calculated weight force with the predetermined weight force it is possible to determine whether ice is located on the blade or not, as ice located on the blade will increase the weight of the blade and thus increase the weight force acting on the blade.

A similar comparison is carried out in relation to the centrifugal force. However, as the centrifugal force is dependent on the rotational speed of the blade, the predetermined centrifugal force is not a single value, but instead a different value for each rotational speed.

The predetermined centrifugal force for a number of different rotational speeds may be stored in a look-up table. If the comparison is manually carried out, the person responsible may find the relevant value for the predetermined centrifugal force in this look-up table. If the exact value is not present in the table, it may be necessary to interpolate between values in the table.

As the comparison may alternatively be automatically carried out, e.g. by a control unit, the look-up table or similar data storage comprising interrelated values for rotational speed and predetermined centrifugal forces may be an integral part of the control unit which may also be configured to interpolate between the present values.

It should be understood, that the method of operating a wind turbine, and thus determine a risk of ice throw may be carried out by a control unit configured to perform the calculations and the comparisons based on the generated load signals. The control unit may be located in the nacelle, in a separate control centre which may be handling data e.g. from numerous wind turbines, or at another place. Communication between the load sensor(s) and the control unit may be cabled communication or wire-less communication. The control unit configured to performe the method of operating the wind turbine could be the main turbine controller.

As both the weight force and the centrifugal force change when ice is located on the blade, the risk of ice throw can be calculated based on comparisons with the predetermined forces, where the predetermined centrifugal force is dependent on the rotational speed of the blade.

It should be understood that by "risk of ice throw" is herein meant the risk of ice falling of the blades during rotation of the blades, including ice being thrown away from the blades during rotation.

Due to the potential danger of ice falling of the blade, the risk of ice throw may alone depend on the fact whether ice is located on the blade or not, without taking the adherence of the ice into account.

To facilitate the determination of the risk of ice throw, the step of comparing the weight force with a predetermined weight force may comprise a step of calculating a weight deviation representing a deviation of the weight force from the predetermined weight force. Thus, the weight deviation may be a measure for the weight of the ice located on the blade.

The step of comparing the centrifugal force with a predetermined centrifugal force may likewise comprise a step of calculating a centrifugal deviation representing a deviation of the centrifugal force from the predetermined centrifugal force.

If the centrifugal deviation is larger than the weight deviation, the ice may be located at the outer part of the blade, i.e. on the part of the blade most far away from the root end of the blade, i.e. the part of the blade closest to the tip end. If, on the contrary, the centrifugal deviation is smaller than the weight deviation, the ice may be located closer to the root end of the blade. If the centrifugal deviation is in the range of the weight deviation, the ice may be located over a larger area of the outer surface of the blade.

Ice located closer to the root end of the blade may not be thrown as far away as ice located closer to the tip end of the blade. This is mainly due to the centrifugal force, and the fact that the tip end of the blade rotates at a much higher speed due to the length of the blade.

Thus, the step of determining the risk of ice throw may additionally comprise a step of providing a risk factor quantifying a higher risk when the centrifugal deviation is higher than the weight deviation and a lower risk when the centrifugal deviation is lower than the weight deviation.

The risk factor may be used when assessing the need for stopping the wind turbine due to ice located on the blade(s). This may be especially important if the wind turbine is located in a closed area with controlled assess to this area, as it may be acceptable to continue running of the wind turbine if ice is located closer to the root end in such an area. On the contrary, larger amounts of ice located closer to the tip may not be acceptable even in closed areas, as ice located closer to the tip may be thrown outside the area. This evaluation may depend on the amount of ice, the rotational speed of the blade, the size of the area, the distance to a neighbouring wind turbine(s) in the same area, the position of the wind turbine within the area, etc.

Furthermore, the step of determining the risk of ice throw may comprise a step of determining an ice position estimate representing distribution of ice on the blade.

It should be understood, that the position of the ice located on the blade may also be a problem for the blade itself, especially if large amounts of ice is located close to the tip end of the blade, as this may expose the blade itself to larger loads than what it is designed for. Thus, the determination of a risk of ice throw may also be used when assessing whether the blade is exposed to too large loads due to ice.

To facilitate calculation of the weight force and/or the centrifugal force, the second position may be displaced substantially 180 degrees relative to the first position, whereby the first and second signals are generated at oppositely located positions of the blade.

To further facilitate the calculation of the weight force and/or the centrifugal force, at least one of the first position and the second position may be substantially vertical.

In a preferred embodiment, the first load signal is generated when the blade is in a first position being substantially vertically downwards, and the second load signal is generated when the blade is in a second position being substantially vertically upwards. It should be understood, that the first and second positions may also be opposite defined.

The predetermined weight force may be determined for at blade without ice attached to the blade. This may e.g. be done when erecting the wind turbine.

The predetermined centrifugal force may likewise be determined for at blade without ice attached to the blade. As the centrifugal force is dependent of the rotational speed of the blade, a look-up table, a data sheet, or other data storage may be provided in which interrelated values for centrifugal force and rotational speed for the wind turbine in question are arranged, i.e. the predetermined centrifugal force may be determined for a plurality of rotational speeds.

The step of calculating the weight force may include defining a linear function between the first and second load signal and using said function.

If the first and second load signals are generated when the blade is in first and second positions being substantially vertically downwards and upwards, respectively, the step of calculating the weight force may include the following function:

$$2 \times F_{weight} = F_{down} + F_{up}$$

where:
$F_{weight}$ is the weight force,
$F_{down}$ is the force based on the first load signal, and
$F_{up}$ is the based on the second load signal.

The step of calculating the centrifugal force may include defining a linear function between the first and second load signal and using said function.

If the first and second load signals are generated when the blade is in first and second positions being substantially vertically downwards and upwards, respectively, the step of calculating the centrifugal force at a given rotational speed may include the following function:

$$2 \times F_{centrifugal} = F_{down} + F_{up}$$

where:
$F_{centrifugal}$ is the centrifugal force,
$F_{down}$ is the force based on the first load signal, and
$F_{up}$ is the based on the second load signal.

BRIEF DESCRIPTION OF THE DRAWING

Embodiments of the invention will now be further described with reference to the drawing, in which FIG. 1 illustrates a wind turbine.

DETAILED DESCRIPTION OF THE DRAWING

It should be understood that the detailed description and specific examples, while indicating embodiments of the invention, are given by way of illustration only, since various changes and modifications within the spirit and scope of the invention will become apparent to those skilled in the art from this detailed description.

FIG. 1 illustrates a wind turbine 1. The wind turbine 1 comprises a tower 2 having a number of tower sections, a nacelle 3 positioned on top of the tower 2, and a rotor 4 extending from the nacelle 3. The tower 2 is erected on a foundation 7. The rotor 4 is rotatable with respect to the nacelle 3, and comprises a hub 5 and three blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The generated electrical energy can be supplied to an electrical grid or to a local community.

In the illustrated embodiment, a load sensor 8 is attached to each blade 6. The load sensors 8 are configured to generate a load signal representing loading on the blades 6.

The generated load signal is communicated to a control unit 9 which may be located in the nacelle 3, in a control centre handling data e.g. from numerous wind turbines, or at another place. For illustrations purposes, the control unit 9 is illustrated separately from the wind turbine, and the communication is illustrated by the dotted lines. It should be understood, that the communication may be cabled communication or wire-less communication.

The control unit 9 is configured to calculate a weight force on the blade 6 based on the first and the second load signal, to calculate a centrifugal force on the blade 6 based on the first and the second load signal, and to compare the weight force with a predetermined weight force and the centrifugal force with a predetermined centrifugal force at the detected rotational speed. Furthermore, the control unit 9 is configured to determine a risk of ice throw based on the comparisons of the weight force and the centrifugal force with the predetermined forces.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of operating a wind turbine, the wind turbine comprising at least one rotatable blade, the method comprising:
   providing a load sensor configured to generate a load signal representing loading on the blade;
   generating a first load signal when the blade is in a first position;
   generating a second load signal when the blade is in a second position;
   detecting a rotational speed of the blade;
   calculating a weight force on the blade based on the first and the second load signal;
   calculating a centrifugal force on the blade based on the first and the second load signal;
   comparing the weight force with a predetermined weight force;
   comparing the centrifugal force with a predetermined centrifugal force at the detected rotational speed;
   determining a risk of ice throw based on the comparisons of the weight force and the centrifugal force with the predetermined forces.

2. A method according to claim 1, wherein comparing the weight force with a predetermined weight force comprises calculating a weight deviation representing a deviation of the weight force from the predetermined weight force.

3. A method according to claim 2, wherein determining the risk comprises providing a risk factor quantifying a higher risk when the centrifugal deviation is higher than the weight deviation and a lower risk when the centrifugal deviation is lower than the weight deviation.

4. A method according to claim 1, wherein comparing the centrifugal force with a predetermined centrifugal force comprises calculating a centrifugal deviation representing a deviation of the centrifugal force from the predetermined centrifugal force.

5. A method according to claim 1, wherein determining the risk comprises determining an ice position estimate representing distribution of ice on the blade.

6. A method according to claim 1, wherein the second position is displaced substantially 180 degrees relative to the first position.

7. A method according to claim 1, wherein at least one of the first position and the second position is substantially vertical.

8. A method according to claim 1, wherein the predetermined weight force is determined for at blade without ice attached to the blade.

9. A method according to claim 1, wherein the predetermined centrifugal force is determined for at blade without ice attached to the blade.

10. A method according to claim 9, wherein the predetermined centrifugal force is determined for a plurality of rotational speeds.

11. A method according to claim 1, wherein calculating the weight force includes defining a linear function between the first and second load signal and using said function.

12. A method according to claim 1, wherein calculating the centrifugal force includes defining a linear function between the first and second load signal and using said function.

13. A wind turbine comprising at least one rotatable blade and a control unit configured to implement claim 1.

* * * * *